UNITED STATES PATENT OFFICE.

ALPHONSE MOREL-LAUTIER, OF GRASSE, FRANCE.

FOOD PRODUCT.

No. 845,472.  Specification of Letters Patent.  Patented Feb. 26, 1907.

Application filed July 5, 1904. Serial No. 215,360.

*To all whom it may concern:*

Be it known that I, ALPHONSE MOREL-LAUTIER, a citizen of the French Republic, residing at Grasse, in France, have invented a certain new and useful Food Product, of which the following is a full, clear, and exact description.

This invention has for its object the preparation of an oil with truffles, to be used as a comestible or food possessing all the characteristic properties of the truffle.

The novel product has the great advantage, while retaining all the constituents of the truffle, that it is not, like it, difficult of assimilation or digestion, and especially that it requires no painful and disagreeable mastication. By its use a much better result is obtained than by the truffle itself, which by its very composition only gives up with great difficulty all its principles. It enables, moreover, a product to be obtained of a quality equal to the fresh truffle at any time of the year and in any country.

Experiments have shown that oils used for comestibles or for food, and especially olive-oil, possess in a very high degree the property of dissolving and retaining intact all the desirable constituents of the truffle. This can be done in such way that it is possible to treat the truffles so that all their active principles are completely extracted from them without any alteration. In this way an oil not only highly perfumed and very delicious in taste is obtained, but a perfect medium for carrying the alimentary principles of the truffle. This result is attained by macerating the truffles in the oil either at the ordinary temperature or hot. After several such treatments repeated with fresh oil the truffles are found to have completely lost their taste, their smell, and their active principles, which have all passed over to the oil. They only retain their color, which there is no advantage in taking over.

It is preferable to carry out the process by direct maceration; but analogous results have been obtained by effecting the exhaustion of the truffles by volatile organic solvents, such as sulfuric ether, benzene, or petroleum ether, then evaporating the solvent and treating the product so obtained with the oil. The solid substance of the truffles after practically all the active principles thereof as well as the taste and smell have been absorbed by the oil is removed from the latter, leaving only the oil to be used as the food product.

Having fully described my invention, what I claim, and desire to secure by Letters Patent, is—

A food product consisting of an olive-oil extract of truffles having the taste and odor characteristic of the latter, substantially as described.

In testimony that I claim the foregoing I have hereunto set my hand this 20th day of June, 1904.

ALPHONSE MOREL-LAUTIER.

Witnesses:
VICTOR MATRAY,
EDMOND LECAUTURIER.